(12) United States Patent
Terashima et al.

(10) Patent No.: US 9,448,748 B2
(45) Date of Patent: Sep. 20, 2016

(54) PRINTING DEVICE, PRINTING SYSTEM, AND CONTROL METHOD OF A PRINTING SYSTEM

(71) Applicant: Seiko Epson Corporation, Tokyo (JP)

(72) Inventors: Katsutoshi Terashima, Azumino (JP); Tadashi Furuhata, Shiojiri (JP); Akio Takamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/768,550

(22) PCT Filed: Mar. 25, 2014

(86) PCT No.: PCT/JP2014/001698
§ 371 (c)(1),
(2) Date: Aug. 18, 2015

(87) PCT Pub. No.: WO2014/156120
PCT Pub. Date: Oct. 2, 2014

(65) Prior Publication Data
US 2016/0004486 A1  Jan. 7, 2016

(30) Foreign Application Priority Data

Mar. 26, 2013 (JP) ................. 2013-065124
Mar. 26, 2013 (JP) ................. 2013-065125

(51) Int. Cl.
*G06F 15/00* (2006.01)
*G06F 3/12* (2006.01)
*G07G 5/00* (2006.01)

(52) U.S. Cl.
CPC ........... *G06F 3/1205* (2013.01); *G06F 3/1209* (2013.01); *G06F 3/1229* (2013.01); *G06F 3/1236* (2013.01); *G06F 3/1279* (2013.01); *G06F 3/1284* (2013.01); *G07G 5/00* (2013.01)

(58) Field of Classification Search
USPC ......................................... 358/1.6
See application file for complete search history.

(56) References Cited

U.S. PATENT DOCUMENTS

| 2005/0018241 A1* | 1/2005 | Azami ............... H04N 1/00204 358/1.15 |
| 2009/0303529 A1 | 12/2009 | Momose |
| 2010/0195132 A1 | 8/2010 | Takashima |
| 2011/0231701 A1* | 9/2011 | Aoki ................. G03G 15/5079 714/15 |

FOREIGN PATENT DOCUMENTS

| JP | 11-134562 A | 5/1999 |
| JP | 11-259410 A | 9/1999 |
| JP | 2004-206411 A | 7/2004 |
| JP | 2008-27224 A | 2/2008 |
| JP | 2008-173857 A | 7/2008 |
| JP | 2008-238588 A | 10/2008 |
| JP | 2010-9098 A | 1/2010 |

(Continued)

*Primary Examiner* — Saeid Ebrahimi Dehkord (57) ABSTRACT

The configuration of printing devices can be changed in a system that controls printing devices without changing the configuration of the control device.

A first printer 30 has a first printer print unit 60; a USB interface 40 that connects to a host computer 10; and a device information storage unit 54B that stores device information including the type of a print unit different from the first printer print unit 60; the device control unit 51 outputting device information stored in the device information storage unit 54B to the host computer 10 when the host computer 10 is connected.

16 Claims, 6 Drawing Sheets

(56) References Cited

FOREIGN PATENT DOCUMENTS

| JP | 2010-176639 A | 8/2010 |
| JP | 2010-218086 A | 9/2010 |
| JP | 2012-96503 A | 5/2012 |

* cited by examiner

PRINTING DEVICE, PRINTING SYSTEM, AND CONTROL METHOD OF A PRINTING SYSTEM

TECHNICAL FIELD

The present invention relates to a printing device, a printing system, and a control method of a printing system.

BACKGROUND

Systems that print by sending data from a computer or other control device to a printer, and can substitute one printer for another printer, are known from the literature. (See, for example, PTL 1.)

CITATION LIST

Patent Literature

[PTL 1] JP-A-2012-096503

SUMMARY OF INVENTION

Technical Problem

To control plural printers as described in PTL 1, the control computer must first be able to control each of the printers. More specifically, a device driver program capable of appropriately controlling each of the printers must be installed on the control computer. As a result, the configuration of the control computer must be changed whenever a different type of printer is added or a printer is replaced in the existing system with printers.

The present invention is directed to this problem, and an objective of the invention is to enable the configuration of printers without changing the configuration of the device on the control side in a system that controls printers.

Solution to Problem

To achieve this objective, a printing device according to another aspect of the invention includes: a print unit configured to print; a connection unit configured to connect to a host device; a storage unit configured to store device information including the type of a different print unit than the print unit; and a controller configured to output the device information stored in the storage unit to the host device when the host device is connected to the connection unit.

A printing device according to another aspect of the invention further includes: a device connection unit configured to connect to a device having a different print unit than the print unit; and an information acquisition unit configured to acquire from the device connected to the device connection unit device information including a type of print unit disposed to the device; wherein the storage unit is configured to store the device information acquired by the information acquisition unit; and the controller is configured to output the device information acquired by the information acquisition unit and stored in the storage unit.

When a printing device having a different print unit is connected in this aspect of the invention, device information is acquired from the printing device and the acquired device information is output to the host. The host device can therefore be made to recognize the printing device as a printing device different from the print unit when the printing device is connected to the host. As a result, a printing device different from the printing device with which the host device is compatible can be connected to the host without changing the configuration of the host device. Therefore, in a system having a host device connected to a printing device, the configuration of printing devices can be changed without changing the configuration of the host device. Furthermore, because the printing device connected to the host device can acquire device information from other printing devices, when the printing device connected to the host device is replaced with a different printing device, there is no need to previously store the device information of the printing device being replaced. Therefore, a single printing device can be connected to the host device as a replacement for various other printers, and the configuration of printers can be easily changed.

In a printing device according to another aspect of the invention, when the host device outputs data that is processed by the print unit disposed to the device, the printing device is configure to output the data to the device connected to the device connection unit.

This aspect of the invention can output data output by the host device to a device with a different print unit through the device connection unit. The printing device can therefore process data output by the host device, and output the data to a device with a different print unit for processing.

In a printing device according to another aspect of the invention the storage unit is configure to store first device information including the type of the print unit, and second device information that is the device information including the type of a different print unit than the print unit; and the controller is configured to output the device information previously specified from among the first device information and second device information stored in the storage unit to the host device when the host device is connected to the connection unit.

Thus comprised, the printing device outputs the specified first device information or second device information to the host device when the printing device connects to the host. As a result, the host device can be made to recognize the printing device as a device with a print unit of the type corresponding to the specified device information. A device with a configuration different from the printing device with which the host is compatible can therefore be connected to the host without changing the configuration of the host device. Therefore, a printing device connected to the host device can be replaced with a different printing device without changing the configuration of the host device. Furthermore, because the printing device stores device information for plural devices, the host device can be made to recognize the printing device as a variety of devices, and a single printing device can be used as a replacement for many other printers.

In a printing device according to another aspect of the invention, the storage unit is configured to store third device information including the type of a print unit different from the first device information and the second device information, and the controller is configured to output the device information previously specified from among the first device information, second device information, and third device information stored in the storage unit.

Thus comprised, a printing device with a print unit stores device information including the type of the print unit, and second device information and third device information including the types of other print units, and outputs the device information selected from among the stored device information to the host device. As a result, the printing device can be connected to the host device, and the host device can be made to recognize the print unit of the connected printing device. The host device can also be made to recognize the printing device as a device with a different print unit. A printing device that can be used in applications connecting the printing device as a conventional printer to the host device, and in applications substituting for another printing device without changing the configuration of the host device.

In another aspect of the invention, the printing device also has an input unit whereby selection of the first device information or the second device information is input.

This aspect of the invention enables inputting the selection of the first device information or the second device information on the printing device. As a result, the host device can be made to recognize the printing device as a desired device without operating the host device.

Another aspect of the invention is a printing system including: a host device configured to output data; a first printing device including a first a print unit configured to print, a connection unit configured to connect to the host device, and a first storage unit configured to store first device information including a type of the first print unit; and a second printing device including a communication unit configured to connect to and to communicate with the first printing device, a second a print unit configured to print, and a second storage unit configured to store second device information including a type of the second print unit; the first storage unit storing the second device information, and sending the second device information stored in the first storage unit to the host device when the host device requests device information from the first printing device.

In a printing system according to another aspect of the invention, the first printing device has an information acquisition unit configured to acquire the second device information through the communication unit of the second printing device; the first storage unit is configured to store the second device information acquired by the information acquisition unit; and the first printing device sends the second device information acquired by the information acquisition unit and stored in the first storage unit to the host device when the host device requests device information from the first printing device.

Thus comprised, a first printing device connected to a host device can acquire and store second device information including the type of a second print unit from a second printing device. Because the first printing device outputs the acquired second device information to the host device, the host device can be made to recognize the first printing device as a device having the second print unit. The first printing device can therefore be connected to a host device that is compatible with a device having the second print unit without changing the configuration of the host device. There is also no need for the second device information to be previously stored in the first printing device. Therefore, a single printing device can be connected to the host device as a replacement for other printers with different kinds of print units, and the configuration of printers can be easily changed without changing the configuration of the host device.

In a printing system according to another aspect of the invention, the host device is configured to send print data processed by the second printing device to the connection unit of the first printing device; the first printing device is configured to receive the print data sent from the host device through the connection unit, and to send the received print data to the second printing device; and the second printing device is configured to receive the print data sent from the first printing device by the communication unit, and to print the received print data by the second print unit.

Thus comprised, the first printing device receives and sends to the second printing device print data that the host device output to a device with the second print unit. Print data output by the host device can therefore be processed by both the first printing device and the second printing device.

In a printing system according to another aspect of the invention, the first printing device has a print data storage unit configured to store predetermined information and print data corresponding to the predetermined information; and the first printing device has a data interpreting unit configured to interpret the print data sent from the host device and to determine if the predetermined information is included in the print data; and the first print unit is configured to print print data corresponding to the predetermined information when the data interpreting unit determines the predetermined information is included.

Thus comprised, the first printing device can be connected to a host device compatible with the second printing device without changing the configuration of the host device, and the first printing device can interpret print data sent by the host device and print information related to the print data.

In a printing system according to another aspect of the invention, the controller is configured to output device information previously specified from among the first device information and second device information stored in the storage unit when the host device requests device information from the first printing device.

Thus comprised, the first printing device connected to the host device outputs the information specified from the first device information and second device information to the host device. As a result, the host device can be made to recognize the first printing device as a device with a print unit of the type corresponding to the specified device information. A first printing device with a print unit different from the second printing device with which the host is compatible can therefore be connected to the host without changing the configuration of the host device. More specifically, the first printing device can be connected as a replacement for the second printing device without changing the configuration of the host device. Furthermore, because the first printing device stores device information for plural devices, the host device can be made to recognize the first printing device as a substitute for the second printing device as well as other printing devices, and the first printing device can be used as a replacement for various other printers.

In a printing system according to another aspect of the invention, when the second device information is sent from the first printing device, the host device is configured to send print data for processing by the second printing device to the connection unit of the first printing device; the first printing device is configured to receive the print data sent from the host device by the connection unit, and to send the received print data to the second printing device; and the second printing device is configured to receive the print data sent from the first printing device, and to print the received print data by the second print unit.

Thus comprised, the first printing device receives print data output by the host device for the second printing device, and sends the received print data to the second printing device. As a result, print data output by the host device can be processed by both the first printing device and the second printing device.

In a printing system according to another aspect of the invention, the first printing device has a print data storage unit that stores predetermined information and print data corresponding to the predetermined information; and a data interpreting unit configured to interpret print data sent from the host device and determines if the predetermined information is included in the print data; and the first print unit is configured to print print data corresponding to the predetermined information when the data interpreting unit determines the predetermined information is included.

Thus comprised, the first printing device can be connected to a host device compatible with a second printing device without changing the configuration of the host device, and the first printing device can interpret print data sent by the host device and print related information.

In a printing system according to another aspect of the invention, the host device is a POS terminal configured to process transaction information; and the second printing device is configured to print a receipt related to the transaction information sent from the POS terminal.

Thus comprised, without changing the configuration of a POS terminal that prints receipts by a second printing device, the first printing device can be connected to the POS terminal to enable printing receipts with the second printing device and executing another process by the first printing device.

Another aspect of the invention is a control method of a printing system wherein a first printing device storing first device information and a second printing device storing second device information are connected, and a host device and the first printing device are connected, the control method including: requesting the first printing device for device information by the host device; and sending stored device information to the host device by the first printing device from which the device information was requested.

A control method of a printing system according to another aspect of the invention further includes: storing first device information by the first printing device; storing second device information by the second printing device; acquiring and storing the second device information stored in the second printing device by the first printing device after the first printing device and the second printing device are connected; requesting device information from the first printing device by the host device when the host device and the first printing device storing the second device information are connected; and sending the stored second device information to the host device by the first printing device from which the device information was requested.

Thus comprised, because the first printing device connected to the host device acquires second device information from a second printing device and outputs the acquired second device information to the host, the host can be made to recognize the first printing device as the second printing device. As a result, without changing the configuration of the host device, the first printing device can be connected to a host device that is compatible with the second printing device. There is also no need for the second device information of the second printing device to be previously stored in the first printing device. Therefore, a single printing device can be connected to the host device as a replacement for various other printing devices, and the configuration of printing devices can be easily changed without changing the configuration of the host device.

The control method of a printing system further includes: sending print data for processing by the second printing device from the host device that received the second device information; sending the print data to the second printing device connected to the first printing device by the first printing device; and printing the print data by the second printing device.

Thus comprised, the first printing device receives and sends to the second printing device print data that the host device output to a device with the second print unit, and the second printing device prints the print data that was sent. Print data output by the host device can therefore be processed by both the first printing device and the second printing device.

The control method of a printing system further includes: requesting the first printing device for the device information including the type of printing device by the host device after the host device and a first printing device with a first print unit are connected; and sending the device information previously specified from among the stored first device information including the type of the first print unit and the second device information including the type of a different print unit than the first print unit to the host device by the first printing device from which the device information was requested.

Thus comprised, the first printing device connected to the host device outputs the specified device information to the host device, the specified device information selected from first device information including the type of print unit in the first printing device and second device information including the type of a different print unit. As a result, the host device can be made to recognize the first printing device as a device with a print unit of the type in the specified device information. A first printing device that is different from the printing device with which the host is compatible can therefore be connected to the host without changing the configuration of the host device. For example, the first printing device can be connected as a replacement for the second printing device without changing the configuration of the host device. Furthermore, because the first printing device stores device information for plural devices, the host device can be made to recognize the first printing device as a substitute for the second printing device as well as other printing devices, and the first printing device can be used as a replacement for various other printers.

DESCRIPTION OF EMBODIMENTS

Embodiment 1

A preferred embodiment of the invention is described below with reference to the accompanying figures.

Figure 1:
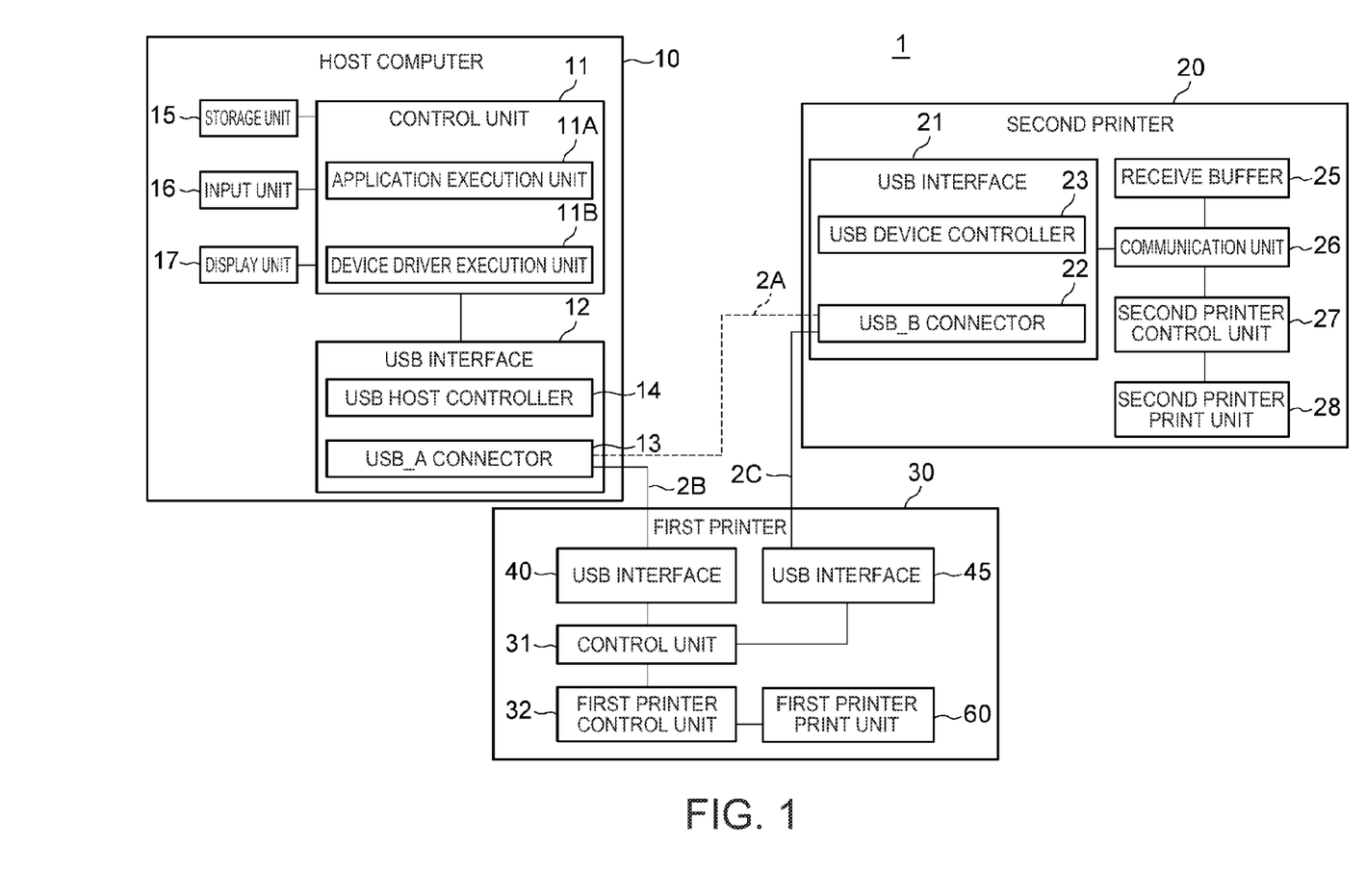
FIG. 1 illustrates the configuration of a printing system according to this embodiment.

FIG. 1 illustrates the configuration of a printing system 1 according to the invention.

The printing system 1 shown in FIG. 1 has a connected host computer 10 (host device), second printer 20 (printing device, second printing device), first printer 30 (printing device, first printing device). The printing system 1 is an example of a printing device according to the invention. The host computer 10 creates text documents, for example, and outputs print commands by running an application program. The second printer 20 prints according to the print commands output by the host computer 10.

The host computer 10 and second printer 20 can connect 1:1 directly through a USB cable 2A, in which case the second printer 20 directly receives commands and data output by the host computer 10 and prints.

The printing system 1 has the first printer 30 connected between the host computer 10 and the second printer 20. This configuration is achieved by adding the first printer 30 to a system having the host computer 10 and second printer 20 connected through a USB cable 2A. More specifically, this system is achieved by disconnecting the USB cable 2A, connecting the first printer 30 by USB cable 2B to the host computer 10, and connecting the first printer 30 to the second printer 20 through USB cable 2C. In other words, the printing system 1 has the first printer 30 and second printer 20 connected in a daisy-chain to the host computer 10.

The host computer 10 includes a control unit 11, a storage unit 15, an input unit 16, and a display unit 17. The host computer 10 also has a USB interface 12 as an interface to which external devices connect. The USB interface 12 includes a USB-A connector 13, and a USB host controller 14 that handles communication with the device connected through a USB cable to the USB-A connector 13 according to a specific protocol.

The control unit 11 includes a CPU and memory such as RAM or ROM, and controls other parts of the host computer 10 by running programs stored in the storage unit 15.

The application execution unit 11A of the control unit 11 executes an application program stored in the storage unit 15. For example, the control unit 11 runs a POS application program and operates as a POS terminal. In this event, the control unit 11 executes a data process related to product sales based on data input by the input unit 16, and outputs data for printing a receipt showing the result of the product sale process together with an instruction to print.

The control unit 11 also has a device driver execution unit 11B. The device driver execution unit 11B runs a device driver program stored in the storage unit 15, and controls devices connected to the host computer 10. The host computer 10 in this embodiment of the invention can execute a device driver program by the device driver execution unit 11B appropriately to a device connected through a USB interface. The device driver execution unit 11B generates print data and print commands causing the printer to print based on the print instructions and data output by the application execution unit 11A, and outputs through the USB interface 12. A device driver that outputs print instructions and data to the second printer 20 is installed on the host computer 10 in this embodiment.

This USB interface 12 and the USB interfaces 21, 40, 45 described below render a physical layer, link layer, and protocol layer conforming to the USB standard, and enable serial data communication between devices connected 1:1. The USB standard as used herein includes USB 1.1 to USB 3.0 and future versions and extensions.

The USB-A connector 13 of the USB interface 12 is a female connector (receptacle) with the shape and pins specified by the USB standard for a connector of the device on the host side. USB cables 2A and 2B conforming to the USB standard can connect to the USB-A connector 13. The USB-A connector 13 may be a mini-A or a micro-A USB terminal. This also applies to the USB-A connector 46 (FIG. 2) described below. The number of USB-A connectors 13 disposed to the USB interface 12 is not specifically limited.

When a device equivalent to a USB device defined by the USB standard is connected to the USB_A connector 13, the USB host controller 14 operates as the host to this device, and can recognize the device and communicate with the device.

The device in this embodiment is, for example, an input/output (I/O) device that connects to a device operating as the host, and outputs data to the host as controlled by the host, or outputs data input from the host. The host is, for example, a computer that sends commands for controlling I/O devices to the connected I/O devices.

The second printer 20 has a second printer print unit 28 (second print unit) that includes a printhead, paper feed motor, conveyance rollers, and cutter unit not shown, and prints (records) text and images on cut-sheet paper, roll paper, or other print medium. The second printer 20 includes a USB interface 21 (communication unit), communication unit 26, and second printer controller 27. The communication unit 26 exchanges data with the device connected through the USB interface 21. The second printer controller 27 controls the second printer print unit 28 and prints based on data received by the communication unit 26.

The USB-B connector 22 of the USB interface 21 is a female connector with the shape and pins specified by the USB standard for a connector on the device side, and can connect to USB cables 2A and 2C conforming to the USB standard. The USB-B connector 22 may be a mini-B or a micro-B USB terminal. This also applies to the USB-B connector 41 (FIG. 2) described below. The USB device controller 23 operates as a USB device as defined by the USB standard. The USB device controller 23 reports its USB device class ID and device ID to the device connected through a USB cable to the USB-B connector 22, and communicates according to the control data sent from the connected device.

The communication unit 26 receives commands and data through the USB interface 21 and temporarily stores the commands and data in the communication buffer 25. The communication unit 26 also transmits control commands and data about the status of the second printer 20 through the USB interface 21.

The second printer controller 27 reads and executes the commands stored in the communication buffer 25 in the order received. For example, when the second printer controller 27 reads a command requesting a status transmission from the communication buffer 25, the second printer controller 27 generates and sends status information describing the operating status of the second printer 20 from the communication unit 26. When a print command accompanying print data is read from the communication buffer 25, the second printer controller 27 controls the second printer print unit 28 and prints according to the command. The second printer controller 27 then generates a completion report indicating that printing ended, or an error report indicating that an error occurred, and transmits the report by means of the communication unit 26 from the USB interface 21.

The first printer 30 has two USB interfaces 40, 45. The host computer 10 is connected to USB interface 40 by USB cable 2B. The second printer 20 is connected to USB interface 45 by USB cable 2C.

The first printer 30 has a control unit 31, first printer print unit 60 (print unit, first print unit), and first printer control unit 32 (print control unit). The control unit 31 controls communication through the USB interfaces 40, 45. The first printer print unit 60 includes a printhead, paper feed motor, conveyance rollers, and cutter unit not shown, and prints.

The first printer control unit 32 controls the first printer print unit 60 and prints based on data sent and received by the control unit 31. The first printer 30 also has an input unit 38 used for input operations by the user. The input unit 38 is an operating panel with switches, for example.

Figure 2:
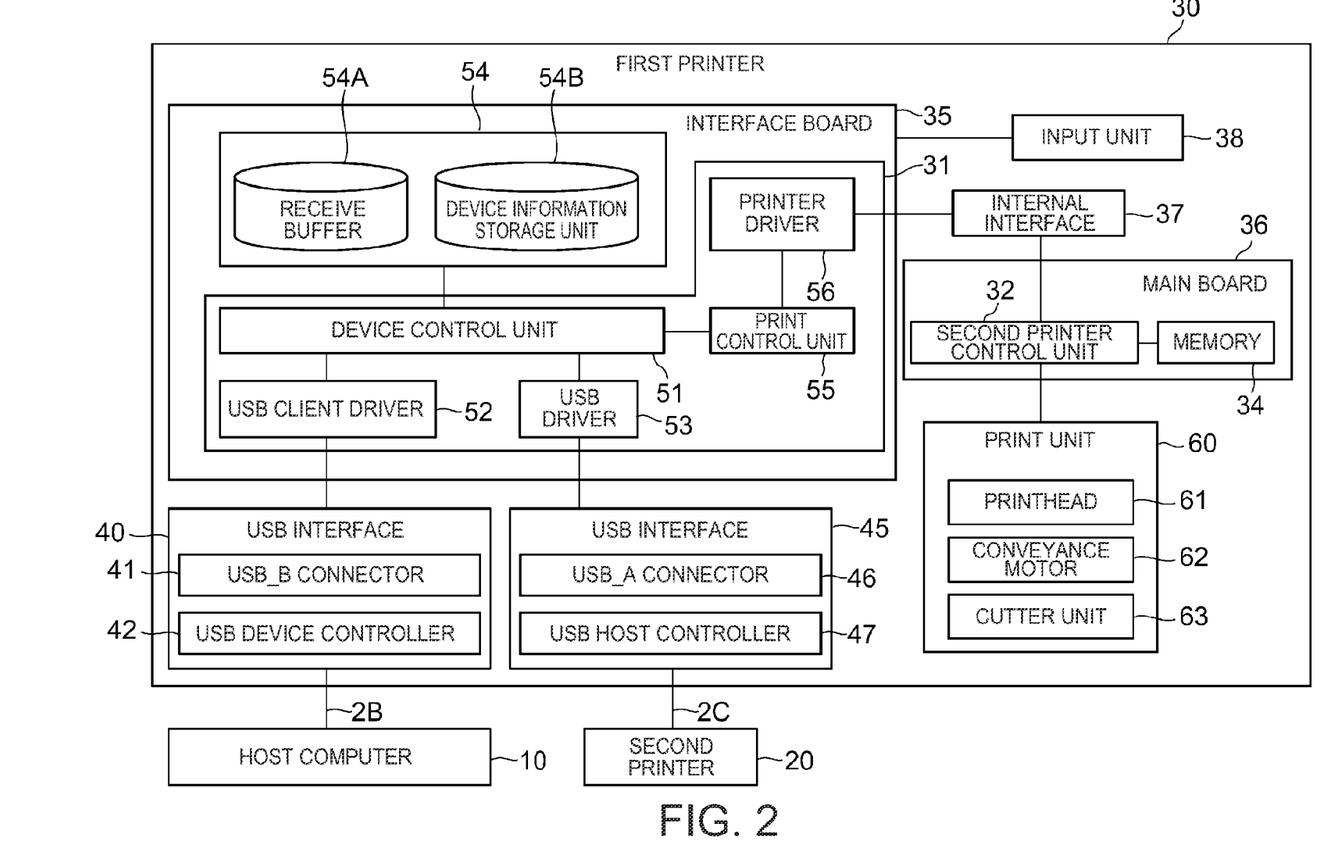
FIG. 2 is a function block diagram of a first printer.

FIG. 2 is a function block diagram of the printing system 1 showing the configuration of the first printer 30 in detail.

As shown in FIG. 2, USB interface 40 (connection unit) includes a USB-B connector 41 (device connector) and a USB device controller 42. USB interface 45 (device connection unit) includes a USB-A connector 46 (host connector) and a USB host controller 47.

Like USB-B connector 22, the USB-B connector 41 is a female connector with the shape and pins specified by the USB standard for a USB device connector, and connects to USB cable 2B.

Like USB-A connector 13, USB-A connector 46 is a female connector with the shape and pins specified by the USB standard for a host connector, and connects to USB cable 2C. The number of USB-A connectors 46 in the USB interface 45 is not specifically limited.

The USB device controller 42 reports its USB device class ID and device ID to the device connected to the USB-B connector 41, and communicates according to the control data sent from the connected device. When a USB device equivalent to a device according to the USB standard is connected to the USB-A connector 46, the USB host controller 47 operates as the host device for the connected device, and can recognize the device and communicate with the device.

More specifically, the first printer 30 operates as a USB device relative to the device connected to USB interface 40 (the host computer 10 in this embodiment), and the first printer 30 operates as a host relative to the device connected to USB interface 45 (the second printer 20 in this embodiment).

The control unit 31 includes a device control unit 51, USB client driver 52, USB driver 53, print control unit 55 (data interpreting unit), and printer driver 56. The control unit 31 includes CPU, RAM, ROM, and other peripheral circuits not shown mounted on the interface board 35, and parts of the control unit 31 are achieved as software constructions as a result of the CPU running a control program. The interface board 35 also has a storage unit 54 (print data storage unit) connected to the control unit 31. The storage unit 54 includes flash ROM mounted on the interface board 35, for example. A receive buffer 54A and device information storage unit 54B (storage unit) are created in the storage space of the storage unit 54. When the control unit 31 receives a print instruction command and data from the host computer 10 as described below, the receive buffer 54A sequentially stores the received commands and data. The device information storage unit 54B stores the USB device information (device information) that the control unit 31 sends to the host computer 10.

The control unit 31 functions as a USB client driver 52 by executing a specific driver program. The USB client driver 52 operates as a USB device conforming to the USB standard relative to the host computer 10 connected to the USB interface 40. When the USB device class ID and device ID are requested by the device connected to the USB interface 40, the USB client driver 52 responds to the request. At this time the USB client driver 52 sends USB device information including the USB device class ID and device ID, and enables data communication between the devices. When the host computer 10 is connected to the USB interface 40 in this embodiment, the USB device information is sent to the host computer 10. The USB client driver 52 can output USB device information including the vendor ID of the first printer 30 manufacturer, and the device ID corresponding to the name of the first printer 30. The USB client driver 52 can also output USB device information containing the vendor ID of the second printer 20 manufacturer and the device ID corresponding to the name of the second printer 20 when this information is preset.

More specifically, the first printer 30 stores the USB device information (first device information) of the first printer 30, and the USB device information (second device information) of the second printer 20, in the device information storage unit 54B.

When the device control unit 51 detects that the host computer 10 was connected to the USB interface 40, the device control unit 51 outputs the USB device information for the second printer 20 stored in the storage unit 54 to the USB client driver 52 according to a previous setting. In this event, the USB client driver 52 reports the USB device information to the host computer 10. As a result, the host computer 10 recognizes that the second printer 20 is connected to the USB-A connector 13 (FIG. 1). In other words, the host computer 10 operates in the same way as when connected to the second printer 20 through USB cable 2A (FIG. 1) even though the host computer 10 is connected to the first printer 30 through USB cable 2B.

Figure 3:
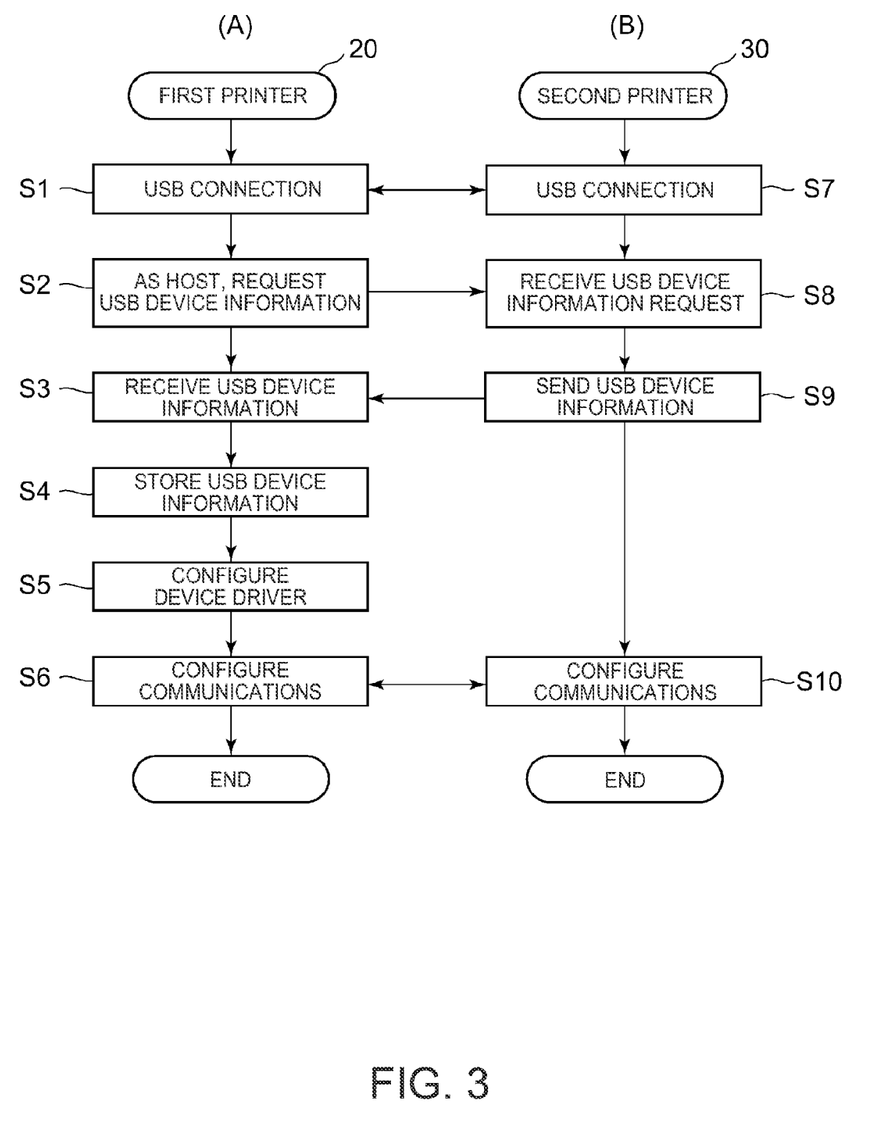
FIG. 3 is a sequence diagram illustrating the operation of parts in the first embodiment.

FIG. 3 is a sequence diagram showing the operation of parts of the printing system 1, FIG. 3 (A) showing the operation of the first printer 30, and (B) showing the operation of the second printer 20. The operation shown in FIG. 3 is executed when the second printer 20 connects to the first printer 30. The operation described in FIG. 3 can be executed before the operation described below with reference to FIG. 4.

When the device control unit 51 (information acquisition unit) of the first printer 30 detects connection of a device to the USB interface 45 (step S1), it operates as a host device to the connected device, and requests the USB device information (step S2).

When the USB device controller 23 of the second printer 20 detects connection of a device to the USB_B connector 22 (step S7), the second printer 20 operates as a USB device. The USB device controller 23 receives the USB device information request sent from the first printer 30 (step S8), and sends the USB device information for the second printer 20 (second device information) to the first printer 30 (step S9). The second printer 20 stores USB device information (second device information) including the type of second printer print unit 28 in a storage unit (second storage unit) not shown. This USB device information is stored when the second printer 20 is manufactured or shipped, and is output to external devices as needed.

The device control unit 51 of the first printer 30 receives the USB device information sent from the second printer 20 (step S3), and stores the received USB device information in the device information storage unit 54B (step S4). The device control unit 51 then executes the device driver program corresponding to the received USB device information and configures the USB driver 53 (step S5). Next, the first printer 30 and second printer 20 configure communication with each other through the USB cable 2C (steps S6, S10), thereby enabling communicating commands and data therebetween.

Through the operation shown in FIG. 3, the first printer 30 gets the USB device information of the second printer 20. As a result, the USB device information of the second printer 20 can be acquired by simply connecting the second printer 20 without needing to first execute an operation that stores the USB device information of the second printer 20 in the first printer 30.

When a print command and print data are output from the host computer 10 connected to USB interface 40, the device control unit 51 stores the commands and data in the receive buffer 54A created in the storage unit 54.

The device control unit 51 outputs the commands and data stored in the receive buffer 54A to the print control unit 55, and outputs to the second printer 20 by means of the USB driver 53. As a result, the commands and data sent by the host computer 10 are transmitted to the second printer 20.

Because the first printer 30 functions as a host device for the second printer 20 through the USB interface 45, the second printer 20 operates according to commands and data in the same way as when commands and data sent directly from the host are received. In other words, the second printer 20 receives the commands and data and prints in the same way as when the host computer 10 is connected to the USB interface 21 through USB cable 2A.

The first printer 30 has a main circuit board 36 (print control board) on which the first printer control unit 32 that controls the first printer print unit 60 is mounted, and an interface board 35.

The interface board 35 can be removably installed to the first printer 30 separately from the main circuit board 36. The control unit 31, memory 33, and USB interfaces 40, 45 are mounted on the interface board 35. The parts mounted on the interface board 35, and the first printer control unit 32 mounted on the main circuit board 36, are connected so that they can exchange data with each other through an internal interface 37 in the first printer 30. Power may be supplied through the internal interface 37 to the parts on the interface board 35, or power may be supplied from the interface board 35 to the main circuit board 36 in a configuration having an external power source connected to the interface board 35. Memory 34 connects to the first printer control unit 32. Memory 34 is a storage unit that temporarily stores commands and data.

As shown in FIG. 2, the first printer print unit 60 includes a printhead 61, paper feed motor 62, and cutter unit 63. The first printer print unit 60 prints as controlled by the first printer control unit 32. More specifically, the first printer print unit 60 conveys print media such as cut-sheet paper or roll paper not shown by means of the paper feed motor 62, prints text or images by means of the printhead 61, cuts the printed print medium with the cutter unit 63, and then discharges the printed medium.

The print control unit 55 (data interpreting unit) determines if the first printer 30 matches the condition for printing based on the commands and data input from the device control unit 51. If the condition for printing are is met, the print control unit 55 generates print commands and print data, and outputs to the printer driver 56.

For example, if the print control unit 55 detects that a predetermined specific string is contained in the print data sent from the host computer 10, the print control unit 55 outputs the print command and print data stored in the storage unit 54 linked to that string to the first printer control unit 32.

More specifically, when the host computer 10 operates as a POS terminal and transmits print commands and print data for printing receipts, the print control unit 55 determines if a predetermined specific product name or product classification data is contained in the print data. If the product name or product classification data is contained in the print data, the print control unit 55 outputs a print command and print data for printing a previously stored coupon to the printer driver 56.

The printer driver 56 is a device driver that drives the first printer print unit 60 and main circuit board 36 of the first printer 30, and is embodied by the control unit 31 executing a specific device driver program.

As a result of this operation, when the host computer 10 sends commands and data for printing a receipt, the second printer 20 produces a receipt according to the received commands and data, and the first printer 30 also prints a coupon related to the receipt.

The host computer 10 and second printer 20 can also operate in the same way as when they are directly connected to each other through USB cable 2A. The first printer 30 can also be connected between the host computer 10 and second printer 20 without modifying the application program or device driver program that run on the host computer 10, and without changing the operating conditions of the second printer 20. The first printer 30 can also print coupons related to the printed receipt, and the second printer 20 can continue to print receipts in the same way as before, without changing the configuration of the host computer 10 and second printer 20.

Figure 4:
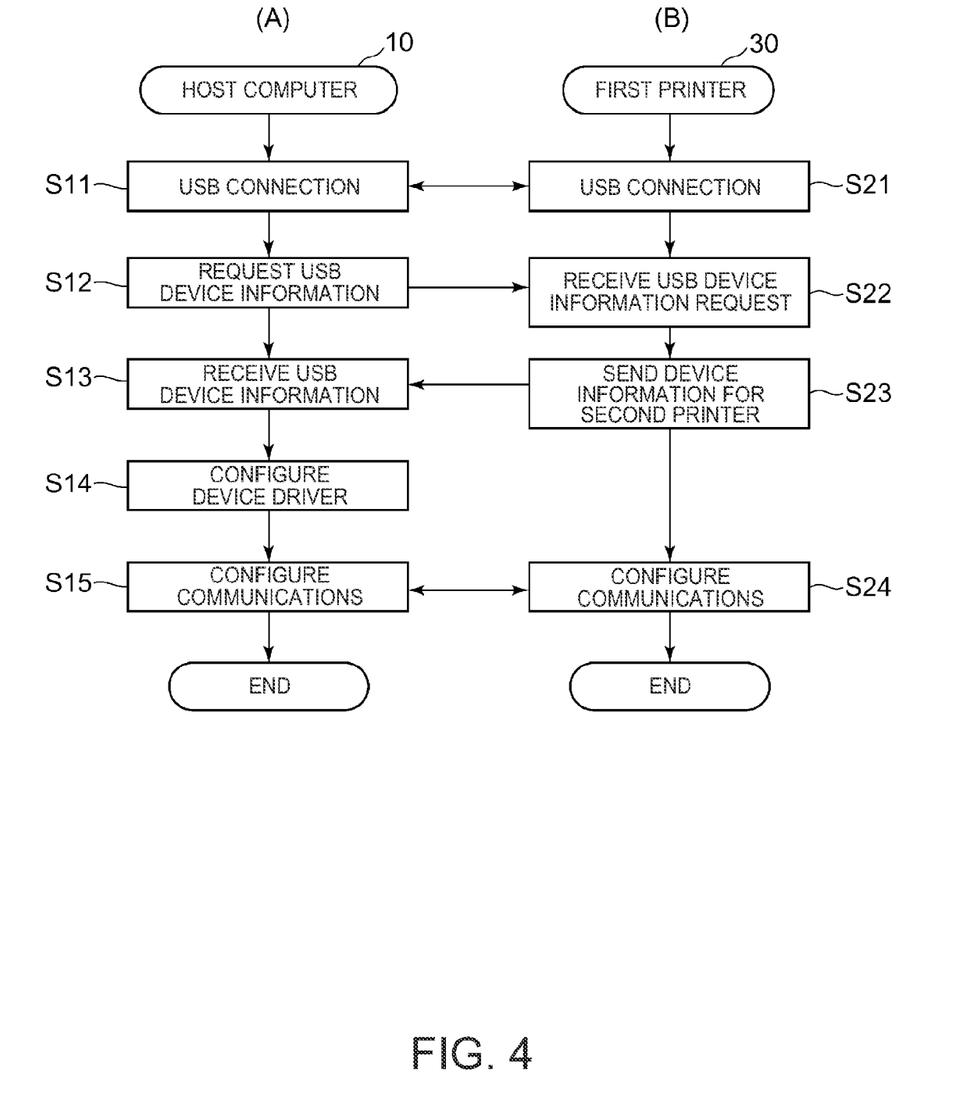
FIG. 4 is a sequence diagram illustrating the operation of parts in the first embodiment.

FIG. 4 is a sequence diagram showing the operation of parts of the printing system 1, column (A) showing the operation of the host computer 10, and (B) showing the operation of the first printer 30. The operation shown in FIG. 4 is executed when the host computer 10 and first printer 30 are connected through USB cable 2B.

When the host computer 10 detects connection of a device to the USB-A connector 13 (step S11), the host computer 10 operates as a host device to the connected device, and requests the USB device information (step S12). When the device control unit 51 of the first printer 30 detects connection of a device to the USB interface 40, the device control unit 51 operates as a device.

The USB device information of the first printer 30 and the USB device information of the second printer 20 are stored in the device information storage unit 54B. The USB device information of the second printer 20 is the information acquired from the second printer 20 by the operation described with reference to FIG. 3. When the device control unit 51 receives a request for USB device information sent from the host computer 10 (step S21), the device control unit 51 reads the USB device information for the second printer 20 stored in the device information storage unit 54B, and sends the information to the host computer 10 (step S23). In other words, the first printer 30 outputs the USB device information of the second printer 20 instead of outputting the USB device information of the first printer 30 as it normally would.

The host computer 10 then receives the USB device information sent from the first printer 30 (step S13), and uses the device driver execution unit 11B to execute the device driver program corresponding to the received USB device information (step S14). The host computer 10 and first printer 30 then communicate with each other through USB cable 2B (steps S15, S24) and open a command and data communication link therebetween. After the operation shown in FIG. 4, the host computer 10 recognizes the target device connected through the USB cable 2B to be the second printer 20 based on the USB device information.

Figure 5:
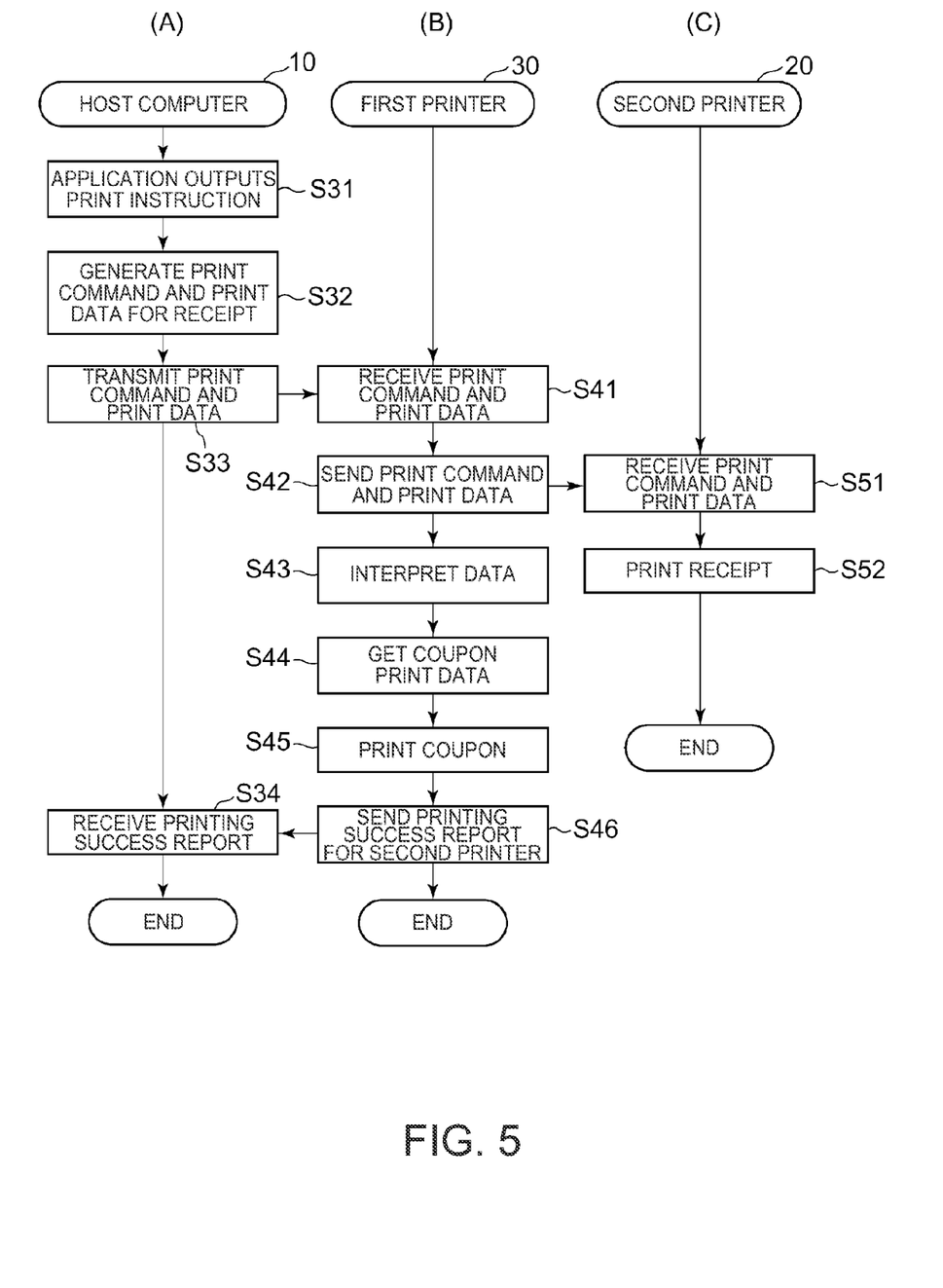
FIG. 5 is a sequence diagram illustrating the operation of parts in the first embodiment.

FIG. 5 is a sequence diagram showing the operation of parts of the printing system 1, column (A) showing the operation of the host computer 10, (B) showing the operation of the first printer 30, and (C) showing the operation of the second printer 20. The operation shown in FIG. 5 is performed after the operation in FIG. 4.

When a document is created and a print instruction is output by the operation of the application execution unit 11A (step S31), the device driver execution unit 11B of the host computer 10 generates a print command and print data for operating the second printer 20 based on the print instruction (step S32), and sends the generated print commands and print data from the USB interface 12 (step S33).

The print command and print data sent by the host computer 10 is then received by the first printer 30 through the USB interface 40 (step S41). The device control unit 51 stores the print command and print data received by the USB interface 40 to the receive buffer 54A, and outputs the print command and print data from the USB interface 45 (step S42). The device control unit 51 also outputs the commands and data stored in the receive buffer 54A to the print control unit 55.

The print control unit 55 analyzes the print data stored in memory 33 (step S43). The print control unit 55 then acquires data for printing a coupon corresponding to the analyzed print data (step S44), and outputs the acquired data to the printer driver 56. The printer driver 56 outputs the data for printing a coupon through the internal interface 37 to the first printer control unit 32, and a coupon is printed as controlled by the first printer control unit 32 (step S45).

The print control unit 55 then generates and outputs a printing success report for the second printer 20 to the host computer 10 (step S46). The host computer 10 receives the printing success report sent from the first printer 30 as the printing success report for the second printer 20 (step S34), and ends this process because printing ended.

The second printer 20 receives the print command and print data sent from the first printer 30 (step S51), and prints a receipt as controlled by the second printer controller 27 according to the received print command and print data (step S52).

As described above, the first printer 30 of the printing system 1 according to the first embodiment of the invention has a first printer print unit 60, a USB interface 40 connected to a host computer 10, and a USB interface 45 that can connect to a device having a print unit different from the first printer print unit 60.

The first printer 30 includes a device control unit 51 that acquires USB device information including the type of second printer print unit 28 in the second printer 20 from the second printer 20, which is a device connected to the USB interface 45, and a device information storage unit 54B that stores the USB device information acquired by the device control unit 51.

When the host computer 10 connects to the USB interface 40, the device control unit 51 outputs the USB device information stored in the device information storage unit 54B to the host computer 10. When the second printer 20, which is a device with a different type of print unit, is connected to the first printer 30, the device control unit 51 acquires the USB device information from the second printer 20 and outputs the acquired USB device information to the host computer 10.

As a result, when connected to the host computer 10, the first printer print unit 60 can be recognized as a printing device other than the first printer print unit 60, such as the second printer 20. Therefore, without changing the configuration of the host computer 10, a printer (first printer 30 in this example) different from the printer (second printer 20 in this example) that is compatible with the host computer 10, can be connected to the host computer 10. As a result, the configuration of printers can be changed without changing the configuration of the host computer 10.

Furthermore, because the first printer 30 acquires the USB device information from the second printer 20, the USB information of the second printer 20 can be stored in situations where the second printer 20 was actually connected to the host computer 10. For example, there is no need for an operation to specifically write the USB device information of the second printer 20 in the first printer 30. The first printer 30 can therefore connect to the host computer 10 as a replacement for various other printers, and the printer configuration can be easily changed.

Furthermore, when the host computer 10 outputs data to be processed by the second printer 20 having the second printer print unit 28, the first printer 30 outputs the data from the USB interface 45 to the second printer 20. As a result, the first printer 30 can process data output by the host computer 10, and the data can also be output to the second printer 20 for processing.

The first printer 30 interprets print data sent from the host computer 10 by the print control unit 55, and stores predetermined information and print data related to the predetermined information in the storage unit 54. The print control unit 55 determines if the predetermined information is contained in the print data, and if the predetermined information is contained, the first printer print unit 60 prints print data corresponding to the information. As a result, without changing the configuration of the host computer 10, a first printer 30 can be connected to a host computer 10 compatible with a second printer 20, and the first printer 30 can interpret print data output by the host computer 10 and print related information, such as a coupon.

The host computer 10 is a POS terminal for processing transaction information, and the second printer 20 prints receipts related to the transaction information sent from the POS terminal. As a result, without changing the configuration of the POS terminal that prints receipts by the second printer 20, the first printer 30 can be connected to the POS terminal device to enable both receipt printing by the second printer 20 and other processing by the first printer 30.

Embodiment 2

The foregoing first embodiment describes an example of acquiring USB device information from the second printer 20 when a second printer 20, which is a device with a different type of print unit, is connected to the first printer print unit 60. In this example, the acquired USB device information is output to the host computer 10.

The second embodiment of the invention describes an example in which USB device information for plural devices is stored in the device information storage unit 54B, and USB device information for a specified device is retrieved from the USB device information for plural devices and output to the host computer 10.

Note that the configuration of the printing system 1 according to the second embodiment of the invention is identical to the configuration shown in FIG. 1 and FIG. 2, and except for differences further description thereof is omitted below.

In this second embodiment, the device information storage unit 54B stores USB device information for at least three devices. More specifically, this example stores USB device information (first device information) including the type of the first printer print unit 60, USB device information (second device information) including the type of the second printer print unit 28, and USB device information (third device information) including the type of another print unit.

The USB device information that is sent from among the USB device information stored in the device information storage unit 54B when the first printer 30 is connected to the host computer 10 is set before the first printer 30 is connected to the host computer 10.

This setting is made by operating the input unit 38 of the first printer 30, for example. The USB device information may alternatively be specified by connecting the host computer 10 to the USB interface 40, and sending control information specifying the USB device from the host computer 10 to the first printer 30. In this event, the host computer 10 or the input unit 16 of the host computer 10 functions as the input unit of the invention. The device control unit 51 may also send information related to the USB device information stored in the device information storage unit 54B to the host computer 10.

More specifically, information such as the USB device name and USB device class contained in the USB device information stored in the device information storage unit 54B is sent to the host computer 10. The model name or ID of the printer related to the USB device information may also be stored in the device information storage unit 54B, and this model name or ID information may be sent to the host computer 10. The model name and ID may also be displayed on the display panel (not shown in the figure) of the first printer 30 and selected by operating the operating panel (not shown in the figure).

The USB device information may also be selected automatically based on a condition such as the time. More specifically, when the host computer 10 is connected to the USB interface 40 and the USB device information is transmitted by the operation described in FIG. 6 below, USB device information corresponding to that date, day, or time, for example, may be specified. In this event, the first printer 30 may store information relating the USB device information stored in the device information storage unit 54B to date, day, and time information with the USB device information in the device information storage unit 54B.

Information relating the model name of the host computer 10 or the ID of the host computer 10 to the USB device information stored in the device information storage unit 54B may also be stored in the device information storage unit 54B. In this event, when connected to the host computer 10, the device control unit 51 selects and sends the USB device information to the host computer 10 based on the model name or ID of the connected host computer 10.

Figure 6:
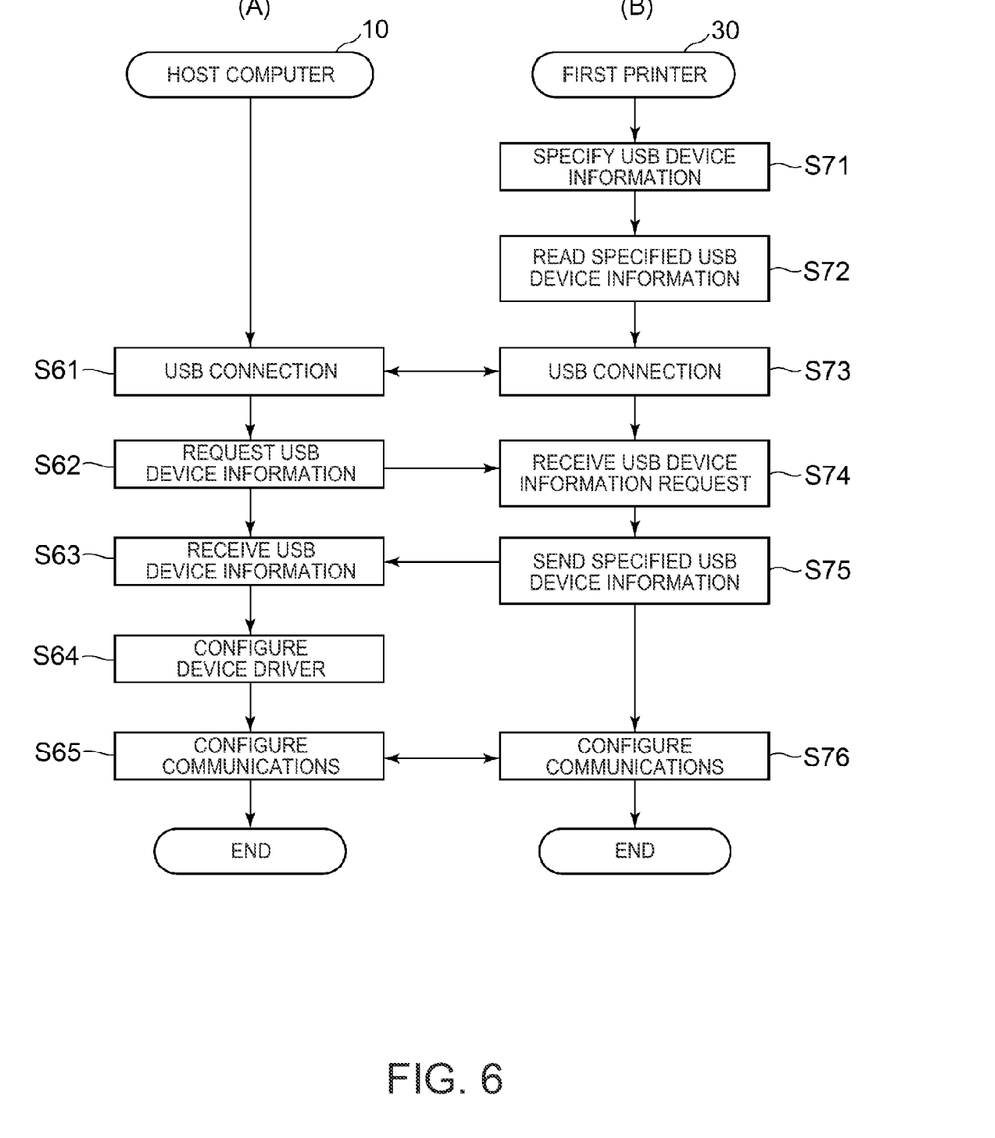
FIG. 6 is a sequence diagram illustrating the operation of parts in the second embodiment.

FIG. 6 is a sequence diagram showing the operation of parts of the printing system 1 according to the second embodiment of the invention, column (A) showing the operation of the host computer 10, and (B) showing the operation of the first printer 30. The operation shown in FIG. 6 is executed when the host computer 10 and first printer 30 are connected through USB cable 2B.

First, the USB device information is selected by operating the input unit 38, for example, on the first printer 30 (step S71), and the selected USB device information is read by the device control unit 51 from the device information storage unit 54B (step S72).

The USB device information read in this step may be specified by the device control unit 51 based on a specific condition such as the model of the host computer 10 or the ID of the host computer 10. Based on the USB device information read from the device information storage unit 54B, the host computer 10 recognizes the printer. More specifically, the first printer 30 causes the host computer 10 to recognize the first printer 30 as the device corresponding to the selected USB device information.

In this embodiment, the first printer 30 sends the USB device information of the second printer 20 to the host computer 10. As a result, the host computer 10 recognizes connection of the second printer 20 even though the first printer 30 is connected.

When the host computer 10 and the first printer 30 are connected through a USB cable 2B, the host computer 10 detects connection of a device to the USB-A connector 13 (step S61). The host computer 10 operates as a host device to the connected device, and requests the USB device information (step S62).

When the device control unit 51 of the first printer 30 detects connection of a device to the USB interface 40 (step S73), the device control unit 51 operates as a device. When the device control unit 51 receives a request for USB device information sent from the host computer 10 (step S74), the device control unit 51 sends the USB device information read in step S72 to the host computer 10 (step S75).

The host computer 10 then receives the USB device information sent from the first printer 30 (step S63), and uses the device driver execution unit 11B to execute the device driver program corresponding to the received USB device information (step S64). The host computer 10 and first printer 30 then communicate with each other through USB cable 2B (steps S65, S76) and open a command and data communication link therebetween. After the operation shown in FIG. 6, the host computer 10 recognizes the first printer 30 as the device corresponding to the USB device information specified in step S71.

After the host computer 10 is connected to the first printer 30 and the first printer 30 sends USB device information to the host computer 10 as described by the sequence in FIG. 6, operation continues as described in the first embodiment.

Step S71 in FIG. 6 illustrates an example in which USB device information including the type of second printer print unit 28 in the second printer 20 is selected from the USB device information stored in the device information storage unit 54B. In this event, the first printer 30 sends USB device information including the type of the second printer print unit 28 to the host computer 10 in step S63 in FIG. 6. As a result, the host computer 10 recognizes the first printer 30 as a device including the second printer print unit 28. In other words, the host computer 10 sends commands and data compatible with the second printer print unit 28 to the first printer 30. This operation is the same as the operation described in FIG. 4.

More specifically, when a print instruction is output by the operation of the application execution unit 11A, the host computer 10 generates and outputs print commands and print data for operating the second printer 20 based on the print instruction.

The first printer 30 then receives the print commands and print data sent by the host computer 10 through the USB interface 40. The first printer 30 stores the received print commands and print data to the receive buffer 54A. The first printer 30 then outputs the print command and print data stored in the receive buffer 54A to the second printer 20 to print. The first printer 30 also interprets the stored print data and prints a coupon. The first printer 30 then generates and sends a printing completion report as the second printer 20 to the host computer 10.

As described above, the first printer 30 according to the second embodiment of the invention has a first printer print unit 60, a storage unit 54 with a device information storage unit 54B, a USB interface 40, and a device control unit 51.

The device information storage unit 54B stores USB device information including USB device information (first device information) identifying the type of the first printer print unit 60, and USB device information (second device information) identifying the type of a print unit different from the first printer print unit 60 (including the second printer print unit 28 of the second printer 20).

The USB interface 40 is connected to the host computer 10. When the host computer 10 is connected to the USB interface 40, the device control unit 51 outputs preset USB device information selected from the USB device information for plural devices stored in the device information storage unit 54B to the host computer 10. As a result, the first printer 30 outputs the USB device information selected from the USB device information for plural devices to the host computer 10.

For example, the USB device information specified from either the USB device information including the type of the first printer print unit 60, and the USB device information including the type of the second printer print unit 28, is output. As a result, the host computer 10 can be made to recognize the first printer 30 as a device with a print unit of the type identified by the specified USB device information. Therefore, without changing the configuration of the host computer 10, a printer different from the printer (second printer 20 in this example) that is compatible with the host computer 10, can be connected to the host computer 10.

The second printer 20 connected to the host computer 10 can therefore be replaced with a first printer 30 of a different type without changing the configuration of the host computer 10. Furthermore, because the first printer 30 stores USB device information for plural devices, the host computer 10 can be made to recognize the first printer 30 as a variety of different printers, and the first printer 30 can be used to replace various printers.

The device information storage unit 54B stores USB device information including USB device information identifying the type of the first printer print unit 60, USB device information identifying the type of the second printer print unit 28, and third device information identifying yet another type of print unit.

The device control unit 51 outputs the USB device information specified from among the USB device information for plural devices stored in the device information storage unit 54B. As a result, the first printer 30 can be recognized by the host computer 10 as the first printer 30, as the second printer 20, and as yet another type of printer. The first printer 30 can therefore be used for normal printer applications, and to replace other printers without changing the configuration of the host computer 10.

The first printer 30 also has an input unit 38 that can be used for an input operation selecting and specifying the USB device information. As a result, the host computer 10 can be made to recognize the first printer 30 as a device with the desired print unit without operating the host computer 10.

The first printer 30 has a USB interface 45 that is connected to the second printer 20 and sends data to the second printer 20 when the host computer 10 outputs data for the second printer 20. As a result, data output by the host computer 10 can be processed by the first printer 30 and can be processed by the second printer 20.

The printing system 1 includes a host computer 10, first printer 30, and second printer 20. The first printer 30 stores USB device information for multiple devices, including USB device information containing the model of the first printer print unit 60, and USB device information containing the model of a print unit (such as the second printer print unit 28 of the second printer 20) that is different from the first printer print unit 60.

This system configuration enables connecting a first printer that is different from the second printer for which the host computer 10 is configured to the host computer 10. More specifically, the first printer can be connected as a replacement for the second printer without changing the configuration of the host computer 10. Furthermore, because the first printer stores USB device information for multiple devices, the host computer 10 can be made to recognize the first printer as a substitute printer for other printers not limited to the second printer, and can handle substitution for various printers.

When the host computer 10 sends print data for processing by the second printer 20 to the USB interface 40, the first printer 30 sends the print data sent from the host computer 10 to the second printer 20. The second printer 20 then prints the print data sent from the first printer 30. The first printer 30 also interprets the print data for receipts, and when predetermined information is contained therein, prints a coupon corresponding to the information.

Preferred embodiment of the invention are described above, but the invention is not limited thereto. For example, the foregoing embodiments describe configurations having host computer 10 connected to USB interface 40 of the first printer 30, and the second printer 20 connected to USB interface 45, but the invention is not so limited. For example, the device that connects to the USB interface 40 may be any device that can operate as a host device, such as another printer or a mobile terminal device having a USB host controller. The device connected to the USB interface 45 may also be any device that operates as a USB target device, such as a printer or other input/output device.

The second printer print unit 28 of the second printer 20, and the first printer print unit 60 of the first printer 30, in the foregoing embodiments are described as printing to cut-sheet paper or roll paper, but specific configuration thereof is not so limited, and a thermal printer, ink jet printer, dot impact printer, laser printer, or other type of printer may be used. The function blocks shown in FIG. 1 and FIG. 2 can also be achieved through the cooperation of hardware and software, and do not suggest a specific hardware configuration. A configuration that executes the operations related to the operations shown in the flow charts in FIG. 3 to FIG. 5 may also be embodied by these parts executing a program stored on an externally connected storage medium.

USB interface 40 and USB interface 45 are also not limited to being rendered as discrete hardware constructions. For example, a configuration having USB-B connector 41 and USB-A connector 46 connected to a single hardware construction having the functions of both USB device controller 42 and USB host controller 47 is obviously conceivable.

INDUSTRIAL APPLICABILITY

As described above, the present invention is useful in a POS terminal to which a printer is connected, and to a POS system using the POS terminal, and can also be applied to a printing device used in a POS system.

REFERENCE SIGNS LIST 1 printing system
2A, 2B, 2CUBS cable
10 host computer (host device)

11 control unit
12 USB interface 12
20 second printer 20 (printing device, second printing device)
21 USB interface (communication unit)
27 second printer control unit 27
28 second printer print unit 28 (second print unit)
30 first printer (printing device, first printing device)
38 input unit
40 USB interface (connection unit)
45 USB interface (device connection unit)
51 device control unit (control unit, information acquisition unit)
54 storage unit
54A receive buffer (print data storage unit)
54B device information storage unit (storage unit)
55 print control unit (data interpreting unit)
60 first printer print unit (print unit, first print unit)

The invention claimed is:

1. A printing device comprising:
a print mechanism configured to print;
a host interface configured to connect to a host device;
a device interface configured to connect to a device having a different print mechanism than the print mechanism;
an information acquirer configured to acquire device information including a type of different print mechanism from the device when the device is connected to the device interface;
a storage configured to store the device information; and
a controller configured to output the device information stored in the storage to the host device when the host device is connected to the host interface;
wherein when the host device connects to the host interface after the device was connected to the device interface and acquired the device information, the controller outputs the device information to the host device.

2. The printing device described in claim 1, wherein when the host device outputs data that is processed by the print mechanism disposed to the device, the printing device is configured to output the data to the device connected to the device interface.

3. The printing device described in claim 1, wherein the storage is configured to store first device information including the type of the print mechanism, and second device information that is the device information including the type of the different print mechanism; and
the controller is configured to output the device information previously specified from among the first device information and second device information stored in the storage to the host device when the host device is connected to the host interface.

4. The printing device described in claim 3, wherein the storage is configured to store third device information including the type of the print mechanism different from that included in the first device information and the second device information, and
the controller is configured to output the device information previously specified from among the first device information, second device information, and third device information stored in the storage.

5. The printing device described in claim 3, further comprising:
an input unit whereby selection of the first device information or the second device information is input.

6. The printing device described in claim 1, further comprising:
a printer driver configured to control the print mechanism; and
a print controller configured to generate print data that is to be output to the printer driver;
wherein the controller receives data suitable for the device information from the host device, outputs the received data to the print controller and the different print mechanism, and generates the print data for the print mechanism based on the received data suitable for the device information, and
wherein the printer driver controls the print mechanism based on the print data.

7. A printing system comprising:
a host device configured to output data;
a first printing device including a first print mechanism configured to print, a host interface configured to connect to the host device, and a first storage configured to store first device information including a type of the first print mechanism; and
a second printing device including a communication unit configured to connect to and to communicate with the first printing device, a second print mechanism configured to print, and a second storage configured to store second device information including a type of the second print mechanism;
the first printing device including an information acquirer configured to acquire the second device information through the communication unit of the second printing device;
the first storage storing the second device information acquired by the information acquirer, and
the first printing device sending the second device information acquired by the information acquirer and stored in the first storage to the host device when the host device requests device information from the first printing device and when the host device connects to the host interface after the second printing device was connected to the first printing device.

8. The printing system described in claim 7, wherein the host device is configured to send print data processed by the second printing device to the host interface of the first printing device;
the first printing device is configured to receive the print data sent from the host device through the host interface, and to send the received print data to the second printing device; and
the second printing device is configured to receive the print data sent from the first printing device by the communication unit, and to print the received print data by the second print mechanism.

9. The printing system described in claim 7, wherein the first printing device has a print data storage configured to store predetermined information and print data corresponding to the predetermined information; and
the first printing device has a data interpreter configured to interpret the print data sent from the host device and to determine if the predetermined information is included in the print data; and
the first print mechanism is configured to print print data corresponding to the predetermined information when the data interpreter determines the predetermined information is included.

10. The printing system described in claim 7, wherein
the first printing device is configured to output device information previously specified from among the first device information and second device information stored in the storage when the host device requests device information from the first printing device.

11. The printing system described in claim 10, wherein
when the second device information is sent from the first printing device, the host device is configured to send print data for processing by the second printing device to the host interface of the first printing device;
the first printing device is configured to receive the print data sent from the host device by the host interface and to send the received print data to the second printing device; and
the second printing device is configured to receive the print data sent from the first printing device, and to print the received print data by the second print mechanism.

12. The printing system described in claim 10, wherein
the first printing device has a print data storage configured to store predetermined information and print data corresponding to the predetermined information; and
a data interpreter configured to interpret print data sent from the host device and to determine if the predetermined information is included in the print data; and
the first print mechanism is configured to print print data corresponding to the predetermined information when the data interpreter determines the predetermined information is included.

13. The printing system described in claim 7, wherein
the host device is a POS terminal configured to process transaction information; and
the second printing device is configured to print a receipt related to the transaction information sent from the POS terminal.

14. A control method of a printing system wherein a first printing device storing first device information and a second printing device storing second device information are connected, and a host device and the first printing device are connected, the control method comprising:
storing first device information by the first printing device;
storing second device information by the second printing device;
acquiring and storing the second device information stored in the second printing device by the first printing device after the first printing device and the second printing device are connected;
requesting first or second device information from the first printing device by the host device when the host device and the first printing device are connected; and
sending first or second device information to the host device by the first printing device when the host device connects to the host interface after the first printing device was connected to the second printing device and acquired the second device information.

15. The control method of a printing system described in claim 14, further comprising:
sending print data for processing by the second printing device from the host device that received the second device information;
sending the print data to the second printing device connected to the first printing device by the first printing device; and
printing the print data by the second printing device.

16. The control method of a printing system described in claim 14, further comprising:
requesting the first printing device for the device information including the type of printing device by the host device after the host device and a first printing device with a first print mechanism are connected; and
sending the device information previously specified from among the stored first device information including the type of the first print mechanism and the second device information including a type of print mechanism different than the first print mechanism to the host device by the first printing device from which the device information was requested.

* * * * *